(12) United States Patent
Ishikura

(10) Patent No.: US 7,571,053 B2
(45) Date of Patent: Aug. 4, 2009

(54) LANE DEVIATION PREVENTION APPARATUS

(75) Inventor: Hisashi Ishikura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 523 days.

(21) Appl. No.: 11/411,928

(22) Filed: Apr. 27, 2006

(65) Prior Publication Data

US 2007/0100551 A1    May 3, 2007

(30) Foreign Application Priority Data

Oct. 31, 2005    (JP) .......................... P2005-316359

(51) Int. Cl.
*B60R 21/00* (2006.01)
*G08G 1/16* (2006.01)

(52) U.S. Cl. .................. 701/301; 348/119; 340/438
(58) Field of Classification Search .................. None
See application file for complete search history.

(56) References Cited

U.S. PATENT DOCUMENTS 6,489,887 B2 * 12/2002 Satoh et al. .................. 340/436

2003/0001732 A1 * 1/2003 Furusho ...................... 340/435
2004/0183663 A1 * 9/2004 Shimakage .................. 340/436

FOREIGN PATENT DOCUMENTS

| EP | 1227438 A2 * | 7/2002 |
| JP | 2004-268845 A | 9/2004 |
| JP | 2006-12191 * | 1/2006 |

* cited by examiner

*Primary Examiner*—Michael J. Zanelli
(74) *Attorney, Agent, or Firm*—Sughrue Mion, PLLC

(57) ABSTRACT

There is provided a lane deviation prevention apparatus which can make a lane deviation prediction judgment more accurately. The lane deviation prevention apparatus includes driving lane shape recognition device to detect a lane mark on a road included in a front image within a lane mark detection distance range and to recognize a shape of a driving lane boundary, and a deviation prediction judgment device that judges, based on the shape of the driving lane boundary, whether the vehicle deviates from a driving lane after a previously set deviation prediction time and outputs a deviation prevention output in a case where it is judged that the vehicle deviates, and the driving lane shape recognition device that dynamically sets the position of the lane mark detection distance range in accordance with a vehicle speed of the vehicle and the deviation prediction time.

5 Claims, 7 Drawing Sheets

LANE DEVIATION PREVENTION APPARATUS

BACKGROUND OF THE INVENTION

1. Field of the Invention

The present invention relates to a lane deviation prevention apparatus mounted on a vehicle.

2. Description of the Related Art

JP-A-2004-268845 discloses a lane deviation prevention apparatus mounted on a vehicle. According to the lane deviation prevention apparatus of the related art, a front image in front of the vehicle is photographed, a lane mark included in the front image is detected in a lane mark detection distance range, the shape of a driving lane boundary is recognized based on the lane mark, a deviation prediction judgment as to whether the vehicle deviates from the driving lane after a set deviation prediction time is made based on the shape of the driving lane boundary, and an output to prevent the deviation is outputted.

However, in the lane deviation prevention apparatus disclosed in the related art, since a position of the lane mark detection distance range for detection of the lane mark is fixed, there is a case where the deviation prediction judgment is made in a region outside the lane mark detection distance range.

In the region outside the lane mark detection distance range, since the shape of the driving lane boundary is not accurately recognized, the deviation prediction judgment becomes inaccurate, a shift occurs in the timing when the deviation prevention output is outputted, and there is a disadvantage that a reliable deviation prevention effect can not be obtained, and further, there is also a disadvantage that an uncomfortable feeling is given to a driver.

When the lane mark detection distance range is enlarged so that the deviation prediction judgment is made in the lane mark detection distance range and in the whole vehicle speed range in which the lane deviation prevention apparatus operates, it is solved that the deviation prediction judgment is made in a region outside the lane mark detection distance range. However, in this case, with the enlargement of the lane mark detection distance range, the amount of calculation of image processing becomes large, and there occurs a disadvantage that a time required for the image processing becomes long, and besides, with the enlargement of the lane mark detection distance range, cases where an image other than the lane mark is erroneously recognized as the lane mark are increased.

SUMMARY OF THE INVENTION

The present invention provides an improved lane deviation prevention apparatus which can make improvement in the shift of timing when a deviation prevention output is outputted, while avoiding the increase in the amount of computation of an image processing and the increase in the erroneous recognition of a lane mark.

A lane deviation prevention apparatus of the invention is a lane deviation prevention apparatus mounted on a vehicle and includes image pickup means, driving lane shape recognition means, deviation prediction judgment means and deviation prevention output means. The image pickup means photographs a front image in front of the vehicle. The driving lane shape recognition means detects a lane mark on a road included in the front image within a lane mark detection distance range and recognizes a shape of a driving lane boundary. The deviation prediction judgment means judges, based on the shape of the driving lane boundary, whether the vehicle deviates from a driving lane after a deviation prediction time which is previously set and outputs a deviation prevention output in a case where it is judged that the vehicle deviates. The deviation prevention output means operates based on the deviation prevention output. In the lane deviation prevention apparatus, a position of the lane mark detection distance range can be adjusted, and the driving lane shape recognition means dynamically sets the position of the lane mark detection distance range in accordance with a vehicle speed of the vehicle and the deviation prediction time.

In the driving lane prevention apparatus according to the invention, since the driving lane shape recognition means dynamically sets the position of the lane mark detection distance range in accordance with the vehicle speed and the deviation prediction time, even if the vehicle speed is changed, the deviation prediction judgment can be made within the lane mark detection distance range, the deviation prediction judgment is made more accurately, and the uncomfortable feeling to the driver can be improved.

DETAILED DESCRIPTION OF THE INVENTION

Hereinafter, some embodiments of the invention will be described with reference to the drawings.

Embodiment 1

Figure 1:
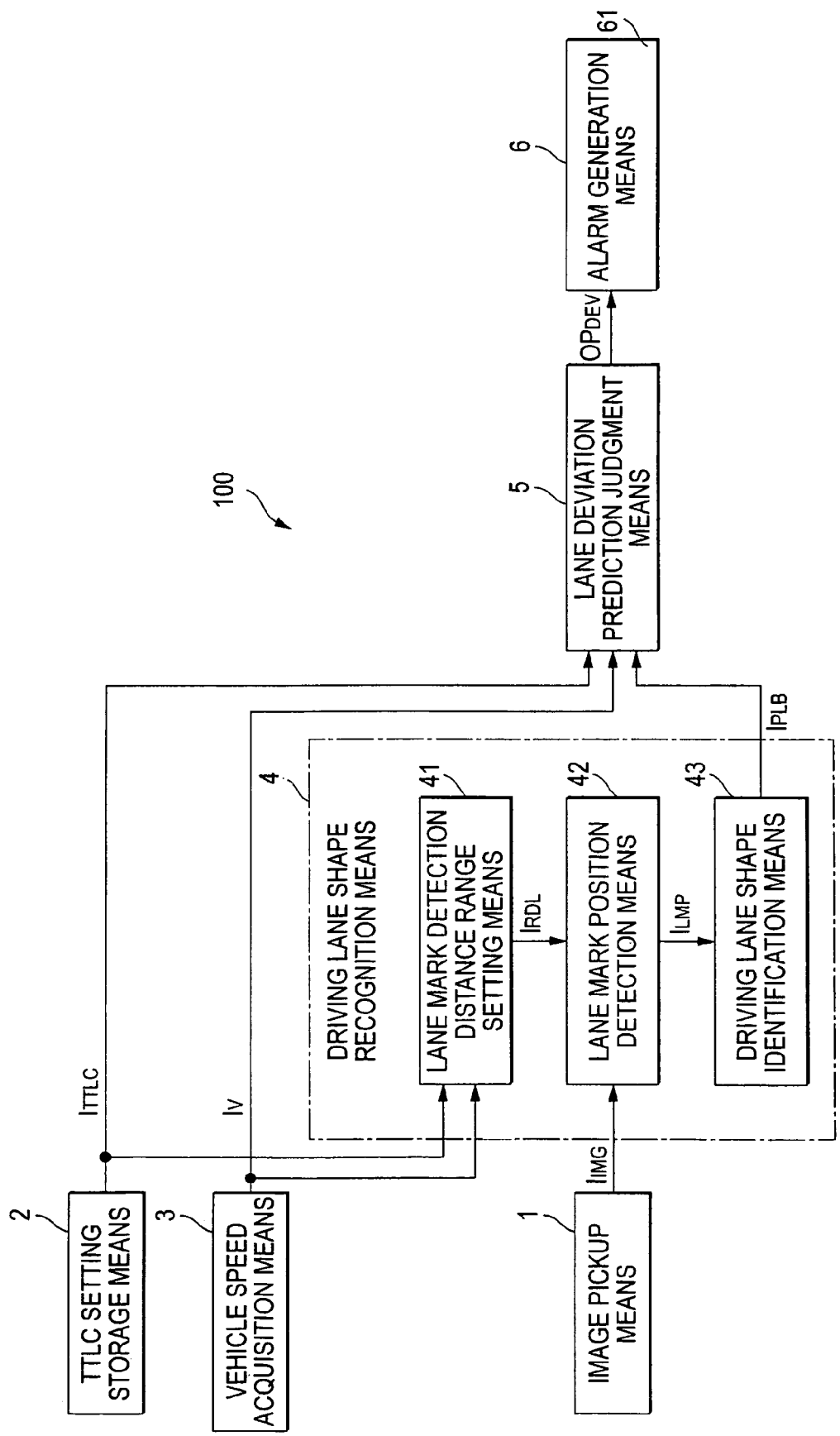
FIG. 1 is a block diagram showing embodiment 1 of a lane deviation prevention apparatus of the invention.

FIG. 1 is a block diagram showing embodiment 1 of a lane deviation prevention apparatus according to the invention. The lane deviation prevention apparatus of embodiment 1 is denoted by reference numeral 100. The lane deviation prevention apparatus 100 is mounted on various vehicles such as automobiles.

The lane deviation prevention apparatus 100 includes image pickup means 1, deviation prediction time setting storage means (TTLC setting storage means) 2, vehicle speed acquisition means 3, driving lane shape recognition means 4, lane deviation prediction judgment means 5, and deviation prevention output means 6.

The image pickup means 1 photographs a front image in front of the vehicle on which the lane deviation prevention apparatus 100 is mounted. This image pickup means 1 includes, for example, a CCD camera and is placed at the periphery of a room mirror in the vehicle on which the lane deviation prevention apparatus 100 is mounted. The image pickup means 1 photographs the front image in front of the vehicle through a front glass of the vehicle, and outputs front image information $I_{IMG}$.

The deviation prediction time setting storage means 2, the vehicle speed acquisition means 3, the lane deviation shape recognition means 4, and the lane deviation prediction judgment means 5 are constructed of, for example, a microcomputer. The deviation prediction time setting storage means 2 is means for previously setting and storing a deviation prediction time TTLC (Time To Line Crossing), and includes, for example, a memory of the microcomputer. The deviation prediction time setting storage means 2 outputs deviation prediction time information $I_{TTLC}$ representing the deviation prediction time TTLC.

The vehicle speed acquisition means 3 receives a traveling speed signal of the vehicle on which the lane deviation prevention apparatus 100 is mounted, and outputs vehicle speed information $I_v$ representing a vehicle speed V. The vehicle speed acquisition means 3 is constructed by, for example, input means of the microcomputer.

The driving lane shape recognition means 4 and the lane deviation prediction judgment means 5 are functional blocks executed by, for example, a central processing unit CPU of the microcomputer. The driving lane shape recognition means 4 includes lane mark detection distance range setting means 41, lane mark position detection means 42, and driving lane shape identification means 43.

The lane mark detection distance range setting means 41 receives the deviation prediction time information $I_{TTLC}$ from the deviation prediction time setting storage part 2, and the vehicle information $I_v$ from the vehicle speed acquisition means 3, and outputs lane mark detection distance range information $I_{RDL}$ representing a lane mark detection distance range RDL. The lane mark position detection means 42 receives the front image information $I_{IMG}$ from the image pickup means 1 and the lane mark detection distance range information $I_{RDL}$ from the lane mark detection distance range setting means 41, and outputs lane mark position information $I_{LMP}$ representing a lane mark position LMP within the lane mark detection distance range RDL. The driving lane shape identification means 43 receives the lane mark position information $I_{LMP}$ from the lane mark position detection means 42, and outputs boundary shape information $I_{PLB}$ representing a driving lane boundary shape PLB.

The lane deviation prediction judgment means 5 receives the deviation prediction time information $I_{TTLC}$ from the deviation prediction time setting storage means 2, the vehicle speed information $I_v$ from the vehicle speed acquisition means 3 and the boundary shape information $I_{PLB}$ from the driving lane shape identification recognition means 43, judges whether the vehicle on which the lane deviation prevention apparatus 100 is mounted deviates from the lane after the deviation prediction time TTLC, and outputs a deviation prevention output $OP_{DEV}$ in a case where it is judged that the deviation occurs.

In embodiment 1, the deviation prevention output means 6 is constructed by alarm generation means 61. The alarm generation means 61 is placed in a compartment of the vehicle on which the lane deviation prevention apparatus 100 is mounted. Specifically, the alarm generation means is constructed by a speaker to generate an alarm sound to the driver, display means, such as an LED, to produce an alarm display to the driver, vibration imparting means for imparting an alarm vibration to a steering wheel, or vibration imparting means for imparting an alarm vibration to a driver's sheet. The alarm generation means 61 receives the deviation prevention output $OP_{DEV}$ from the lane deviation prediction judgment means 5, generates an alarm to the driver of the vehicle on which the lane deviation prevention apparatus 100 is mounted, and urges the driver to perform a lane deviation prevention operation.

Figure 2:
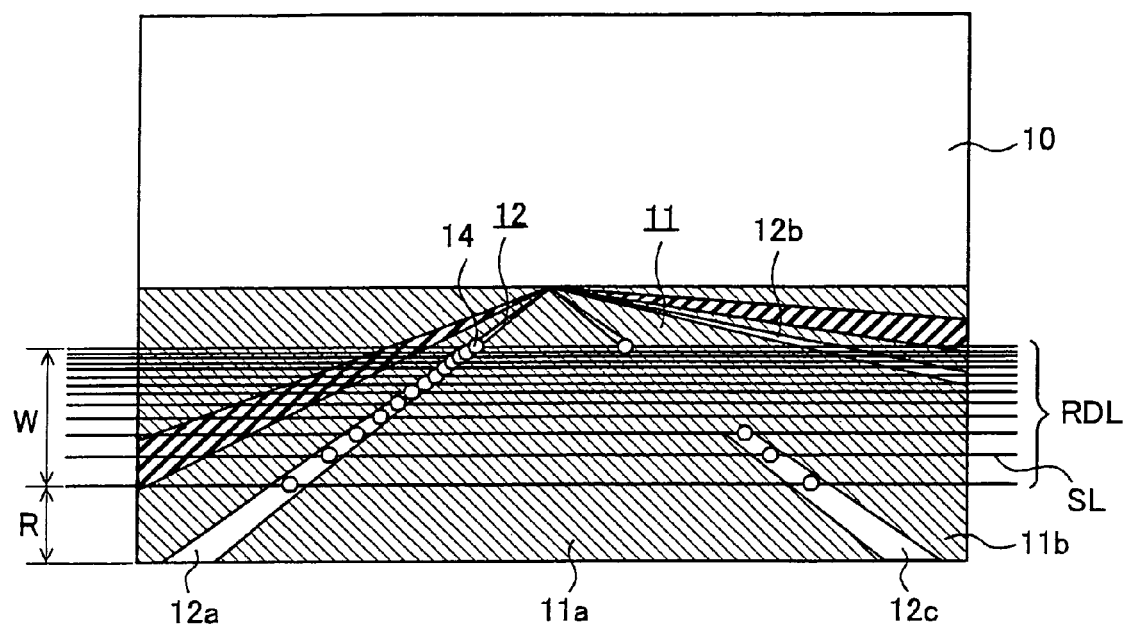
FIG. 2 is a screen view showing an example of a front image according to embodiment 1.
Figure 3:
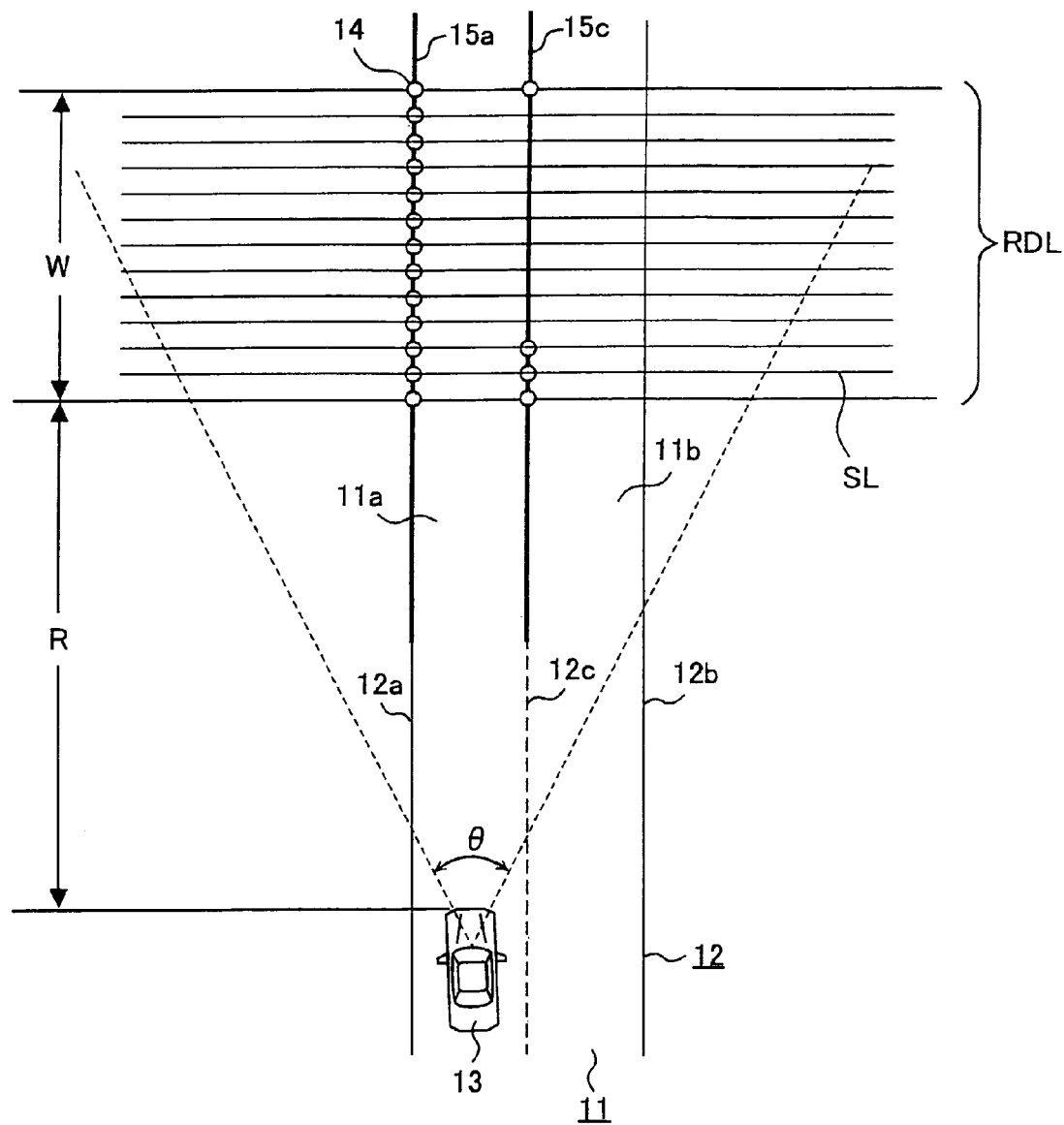
FIG. 3 is a top plan view corresponding to FIG. 2.

The driving lane shape recognition means 4 in embodiment 1 will be described in more detail with reference to FIGS. 2 and 3. FIG. 2 is a screen view showing an example of a front image 10 in front of the vehicle photographed by the image pickup means 1, and FIG. 3 is a top plan view corresponding to the front image 10 exemplified in FIG. 2. The front image 10 shown in FIG. 2 includes a road 11 and a lane mark 12. In FIG. 3, a vehicle 13 traveling on the road 11 is also shown. The vehicle 13 is an automobile on which the lane deviation prevention apparatus 100 is mounted. FIG. 2 shows the front image 10 photographed by the image pickup means 1 of the lane deviation prevention apparatus 100, mounted on the vehicle 13. Incidentally, in FIG. 3, reference character θ denotes a horizontal image angle of view of the image pickup means 1.

The road 11 includes two driving lanes 11a and 11b adjacent to each other. The driving lane 11a is a lane for traveling in one direction, and the driving lane 11b is the opposite lane for traveling in the direction opposite to the driving lane 11a. In FIGS. 2 and 3, the road 11 is exemplified as the road extending straight. In FIG. 3, the illustration is made under the assumption that the vehicle 13 goes straight ahead on the driving lane 11a of the road 11 along the driving lane 11a.

The lane mark 12 is depicted on the road 11. The lane mark 12 includes bilateral lane marks 12a and 12b positioned at both sides of the road 11, and a center lane mark 12c positioned at the center of the road 11. The driving lane 11a is defined between the lane marks 12a and 12c, and the driving lane 11b is defined between the lane marks 12b and 12c. The bilateral lane marks 12a and 12b demarcate the left boundary of the driving lane 11a and the right boundary of the driving lane 11b, respectively. The center lane mark 12c demarcates the boundary between the driving lanes 11a and 11b.

The lane mark detection distance range setting means 41 shown in FIG. 1 sets a position of the lane mark detection distance range RDL, and the lane mark detection distance range RDL, together with the road 11 and the lane mark 12, is shown in FIGS. 2 and 3. The lane mark detection distance range RDL with a specified width W is set so as to run across the front image 10 in the horizontal direction. Since FIGS. 2 and 3 exemplify the case in which the road 11 is a straight road, and the vehicle 13 goes straight ahead on the driving lane 11a along the driving lane 11a, the lane mark detection distance range RDL crosses the respective driving lanes 11a and 11b of the road 11 at right angles.

The lane mark detection distance range RDL is set at a position spaced from the front end of the vehicle 13 by a setting distance R. This setting distance R can be adjusted and is adjusted by the lane mark detection distance range setting means 41. Even if this setting distance R is adjusted, the specified width W of the lane mark detection distance range RDL is kept to be the constant value.

The lane mark position detection means 42 detects the positions of the lane marks 12a and 12c of the driving lane 11a within the lane mark detection distance range RDL on the basis of the front image information $I_{IMG}$ in the lane mark detection distance range RDL, and outputs the lane mark position information $I_{LMP}$.

Specifically, as shown in FIGS. 2 and 3, the lane mark position detection means 42 sets plural n search lines SL extending in the horizontal direction within the lane mark detection distance range RDL, and detects the positions of the lane marks 12a and 12c on each of the search lines SL from the front image information $I_{IMG}$ on each of the search lines SL. The n search lines SL are set on the upper plan view of FIG. 3 to be parallel to each other and to be arranged at equal intervals to each other. Of course, the n search lines SL are not set, and the positions of the lane marks 12a and 12c can also be detected from all the front image information $I_{IMG}$ within the lane mark detection distance range RDL. Incidentally, since the lane mark 12b does not define the boundary of the driving lane 11a, the information relating to the position of the lane mark 12b is deleted.

The lane mark position detection means 42 detects the positions of the lane marks 12a and 12c by using, for example, an edge detection method. However, in addition to the edge detection method, for example, an image filter for white line detection disclosed in JP-A-10-320549 can also be used. The lane mark positions detected by the lane mark position detection means 42 are denoted by reference numeral 14 in FIGS. 2 and 3.

The driving lane shape identification means 43 identifies the boundary shape of the driving lane 11a based on the lane mark position information $I_{LMP}$ from the lane mark position detection means 42, and outputs the boundary shape information $I_{PLB}$. The driving lane shape identification means 43 uses a model expression, such as a polynomial which can express the boundary shape, specifies parameters of the model expression by, for example, the least-squares method so as to most suit the lane mark position information $I_{LMP}$, and identifies the boundary shape of the driving lane 11a.

The identified boundary shapes are denoted by reference numerals 15a and 15c in FIG. 3. The boundary shape 15a is the left boundary shape of the driving lane 11a identified based on the position detection of the lane mark 12a, and the boundary shape 15c is the right boundary shape of the driving lane 11a identified based on the position detection of the lane mark 12c. The boundary shapes 15a and 15c are identified on the lane marks 12a and 12c and along the lane marks 12a and 12c within the lane mark detection distance range RDL set by the lane mark detection distance range setting means 41. Within a region outside the lane mark detection distance range RDL, the boundary shapes 15a and 15c have shapes obtained by extending the boundary shapes 15a and 15c specified within the lane mark detection distance range RDL, and especially in the case where the road 11 curves and the lane mark 12 curves, they depart from the lane marks 12a and 12c.

Next, the operation of the lane deviation prediction judgment means 5 will be described in detail. The lane deviation prediction judgment means 5 calculates a deviation prediction judgment distance D from the front end of the vehicle 13, and makes a lane deviation prediction judgment Jdev as to whether the vehicle 13 deviates from the lane 11a at the deviation prediction judgment distance D. The deviation prediction judgment distance D is expressed by D=TTLC×V. The deviation prediction time TTLC is for setting a deviation prediction time TGO when the deviation prediction of the vehicle 13 is performed, and it is meant that the deviation prediction of the vehicle 13 is performed at the deviation prediction time TGO after the deviation prediction time TTLC from the present time TP. The present time TP is sequentially updated in accordance with the lapse of time. The deviation prediction judgment distance D means an estimated traveling distance of the vehicle 13 in the deviation prediction time TTLC. The deviation prediction judgment distance D is calculated by multiplying the deviation prediction time information $I_{TTLC}$ from the deviation prediction time setting storage means 2 and the vehicle speed information $I_v$ from the vehicle speed acquisition means 3. The lane deviation prediction judgment Jdev is made based on the deviation prediction judgment distance D and the boundary shape information $I_{PLB}$ from the driving lane shape identification means 43.

Figure 4:
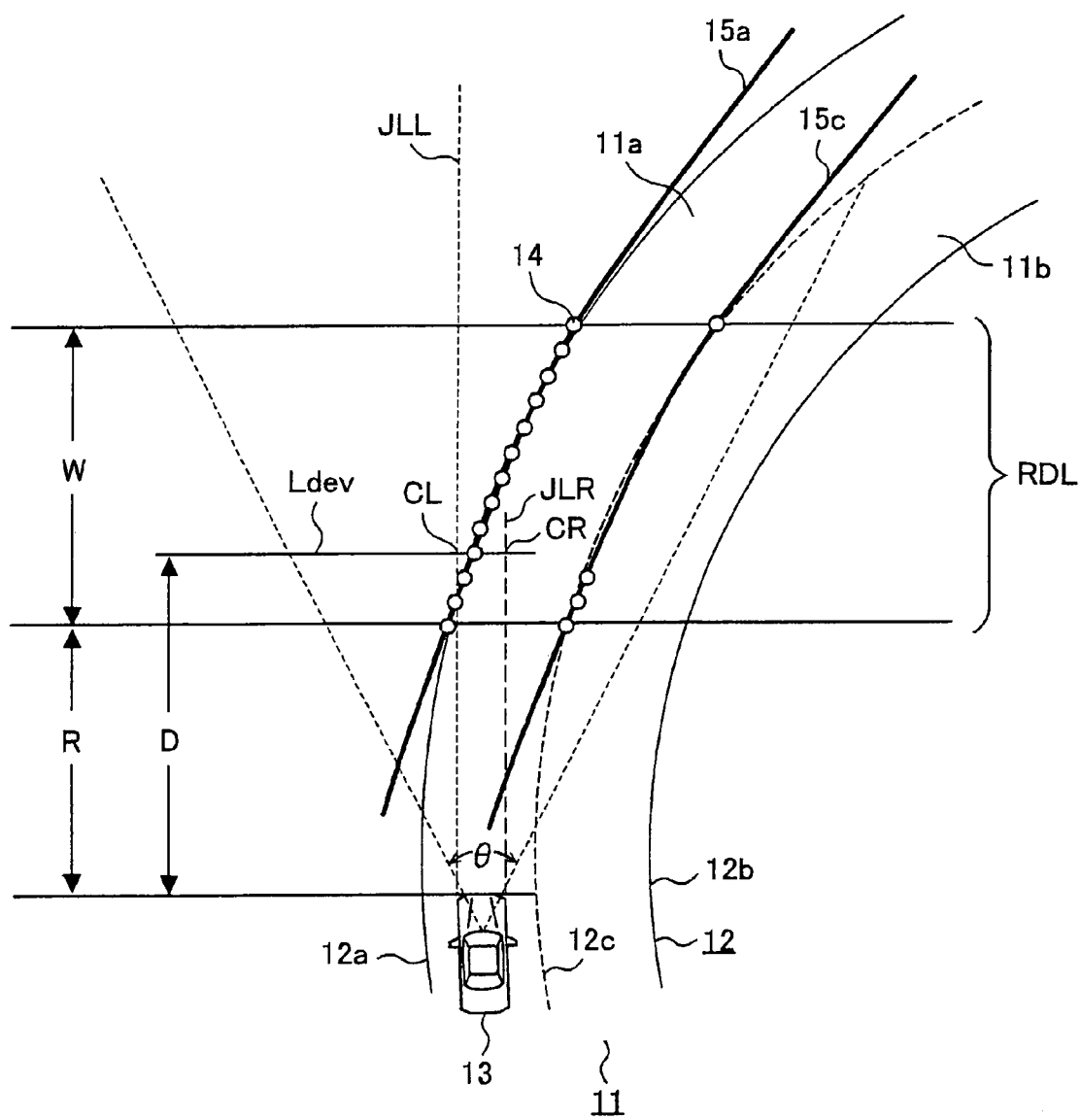
FIG. 4 is an explanatory view of a lane deviation judgment operation according to embodiment 1, which is concerned with a case where a road curves.

FIG. 4 is an explanatory view of the lane deviation prediction judgment Jdev of embodiment 1 in the case where the road 11 curves. In FIG. 4, the road 11 curves to the right toward the front of the vehicle 13 and the driving lanes 11a and 11b and the lane marks 12a and 12c also curve to the right toward the front of the vehicle 13. The boundary shapes 15a and 15c identified by the driving lane shape identification means 43 are identified on the lane marks 12a and 12c and along the lane marks 12a and 12c within the lane mark detection distance range RDL. However, in a region outside the lane mark detection distance range RDL, they depart from the lane marks 12a and 12c.

In FIG. 4, a deviation prediction judgment line Ldev of the vehicle 13 is located at a position spaced from the front position of the vehicle 13 by the deviation prediction judgment distance D, and the lane deviation prediction judgment Jdev as to whether the vehicle 13 deviates from the driving lane 11a is made at this deviation prediction judgment line Ldev. A left side vehicle reference line JLL extended from the left side of the vehicle 13 which is predicted to deviate is used in this lane deviation prediction judgment Jdev. In FIG. 4, since an intersection point CL of the deviation prediction judgment line Ldev and the left side vehicle reference line JLL is located outside of the boundary shape 15a, in the lane deviation prediction judgment Jdev, it is judged that there is a danger of deviation, and the lane deviation prediction judgment means 5 outputs the deviation prevention output $OP_{DEV}$. The lane deviation prediction judgment means 5 is constructed to output the deviation prevention output $OP_{DEV}$ also when the intersection point CL of the deviation prediction judgment line Ldev and the left side vehicle reference line JLL is located on the boundary shape 15a. When the intersection point CL of the deviation prediction judgment line Ldev and the left side vehicle reference line JLL is located between the boundary shapes 15a and 15c, the lane deviation prediction judgment means 5 does not output the deviation prevention output $OP_{DEV}$.

In the case where the road 11 curves to the left toward the front of the vehicle 13, since the deviation of the right side of the vehicle 13 is predicted, a right side vehicle reference line JLR extended from the right side of the vehicle 13 is used. When an intersection point CR of the right side vehicle reference line JLR and the deviation prediction judgment line Ldev is located on the boundary shape 15c or at the outside thereof, the lane deviation prediction judgment means 5 outputs the deviation prevention output $OP_{DEV}$. When the intersection point CR of the deviation prediction judgment line Ldev and the right side vehicle reference line JLR is located between the boundary shapes 15a and 15c, the lane deviation prediction judgment means 5 does not output the deviation prevention output $OP_{DEV}$.

In embodiment 1, the lane mark detection distance range setting means 41 dynamically adjusts the position of the lane mark detection distance range RDL on the front image 10 based on the deviation prediction time information $I_{TTLC}$ representing the deviation prediction time TTLC from the deviation prediction time setting storage means 2 and the vehicle speed information $I_v$ representing the vehicle speed v from the vehicle speed acquisition means 3. The position adjustment of the lane mark detection distance range RDL is performed by adjusting the setting distance R, and the setting distance R is dynamically adjusted so that the deviation prediction judgment line Ldev is always located within the lane mark detection distance range RDL.

Also in FIG. 4, the deviation prediction judgment line Ldev is positioned within the lane mark detection distance range RDL. As described above, within the lane mark detection distance range RDL, the boundary shapes 15a and 15c identified by the driving lane shape identification means 43 are identified on the lane marks 12a and 12c and along the lane marks 12a and 12c. Thus, when the deviation judgment line Ldev exists within the lane mark detection distance range RDL, the position judgment of the intersection points CL and CR can be accurately performed. Specifically, the position judgment as to whether the intersection point CL, CR exists on the boundary shape 15a, 15c or at the outside thereof can be made accurately, and the deviation prevention output $OP_{DEV}$ can be outputted at an appropriate timing.

Figure 5:
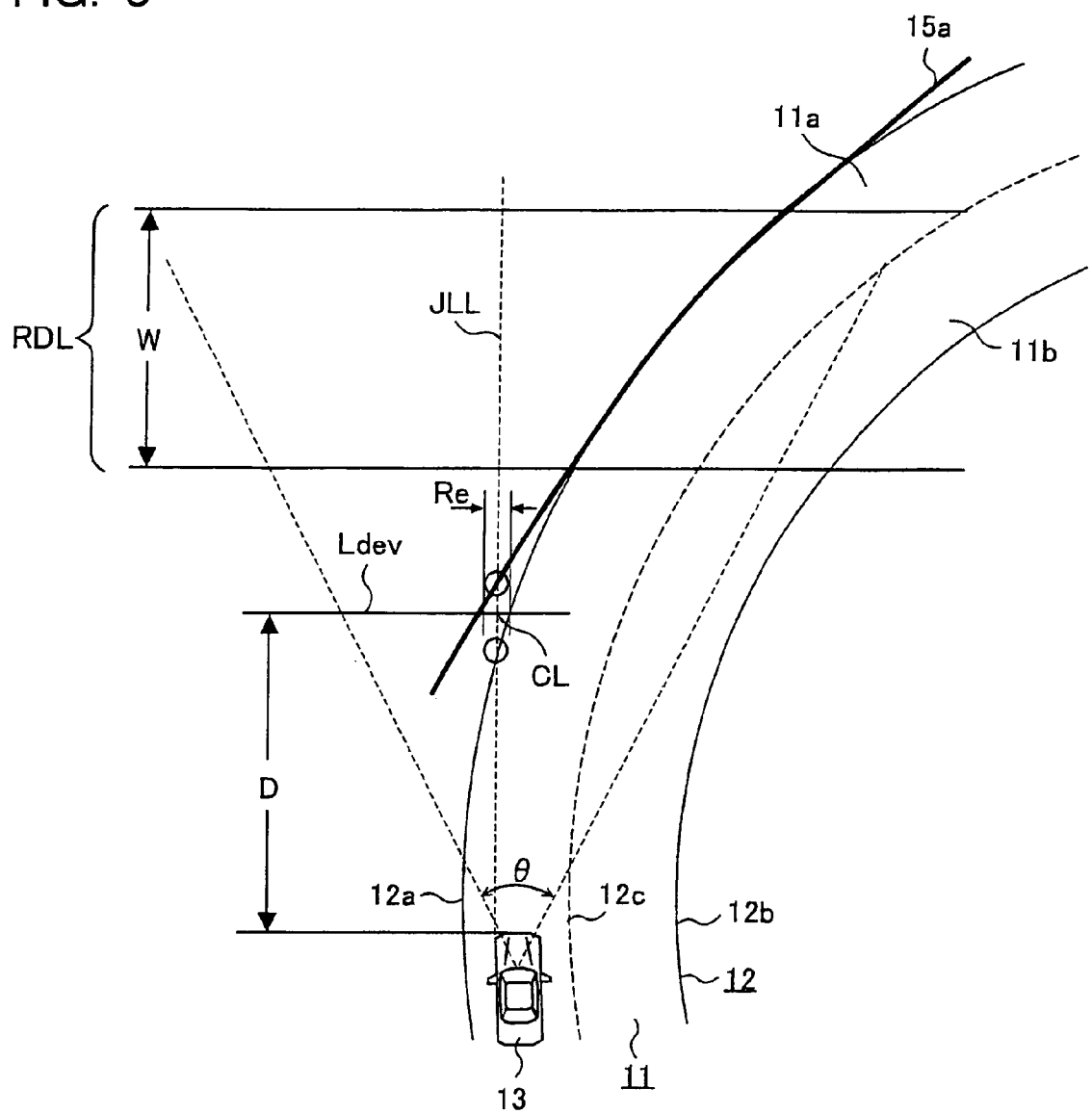
FIG. 5 is an explanatory view of a lane deviation judgment operation which is concerned with a case where a road curves and a case where a deviation judgment line falls outside a lane mark detection distance range.

For comparison with FIG. 4, FIG. 5 is an explanatory view of the lane deviation prediction judgment operation Jdev in the case where the deviation prediction judgment line Ldev is positioned outside of the lane mark detection distance range RDL. In FIG. 5, the deviation prediction judgment line Ldev is positioned between the lane mark detection distance range RDL and the vehicle 13. In FIG. 5, on the deviation prediction judgment line Ldev, the boundary shape 15a is shifted to the left by an error distance Re from the lane mark 12a. Thus, although the intersection point CL of the deviation prediction judgment line Ldev and the left side vehicle reference line JLL exists outside of the lane mark 12a, it is located inside of the boundary shape 15a, that is, between the boundary shapes 15a and 15c. Thus, an erroneous judgment is made that there is no danger of deviation, and the deviation prevention is not performed, and further, an uncomfortable feeling is given to the driver.

Figure 6:
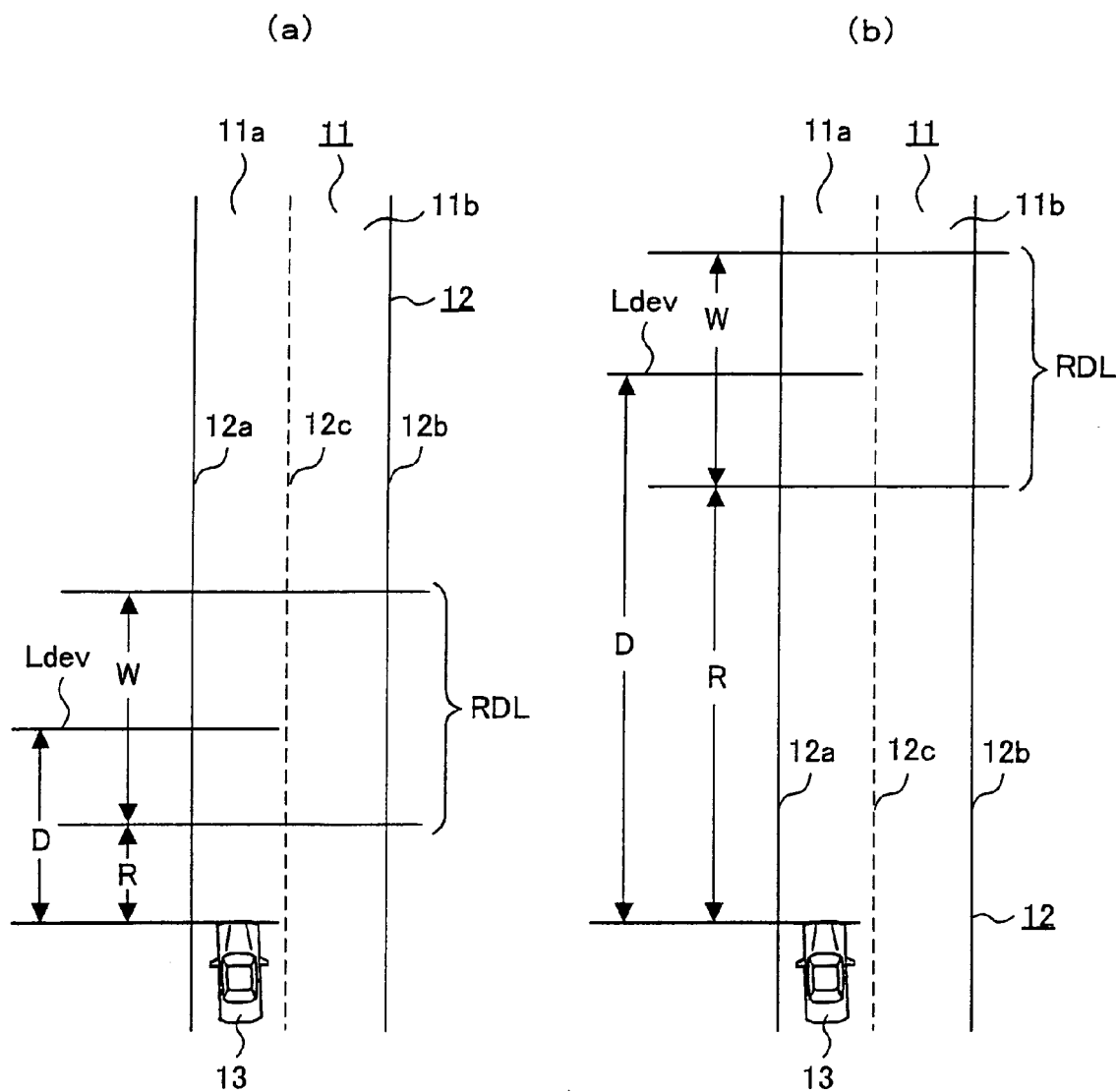
FIGS. 6(a) and 6(b) are explanatory views in which the lane deviation prediction judgment operation according to embodiment 1 becomes more accurate.

FIGS. 6(a) and 6(b) are explanatory views for explaining the accuracy of the lane deviation prediction judgment operation according to embodiment 1. FIG. 6(a) shows a case where the vehicle speed V is low and the deviation prediction judgment distance D is small, and FIG. 6(b) shows a case where the vehicle speed V is high and the deviation prediction judgment distance D is large. In embodiment 1, the setting distance R to the lane mark detection distance range RDL is dynamically adjusted so that the deviation prediction judgment line Ldev is always positioned within the lane mark detection distance range RDL. Consequently, in both the cases of FIGS. 6(a) and 6(b), the deviation prediction judgment line Ldev exists within the lane mark detection distance range RDL, the lane deviation prediction judgment operation by the lane deviation prediction judgment means 5 becomes accurate, and the deviation prevention output $OP_{DEV}$ is outputted at a more appropriate timing. Thus, the driver is urged to perform the deviation prevention operation more appropriately, and the uncomfortable feeling to the driver can also be improved.

Embodiment 2

Figure 7:
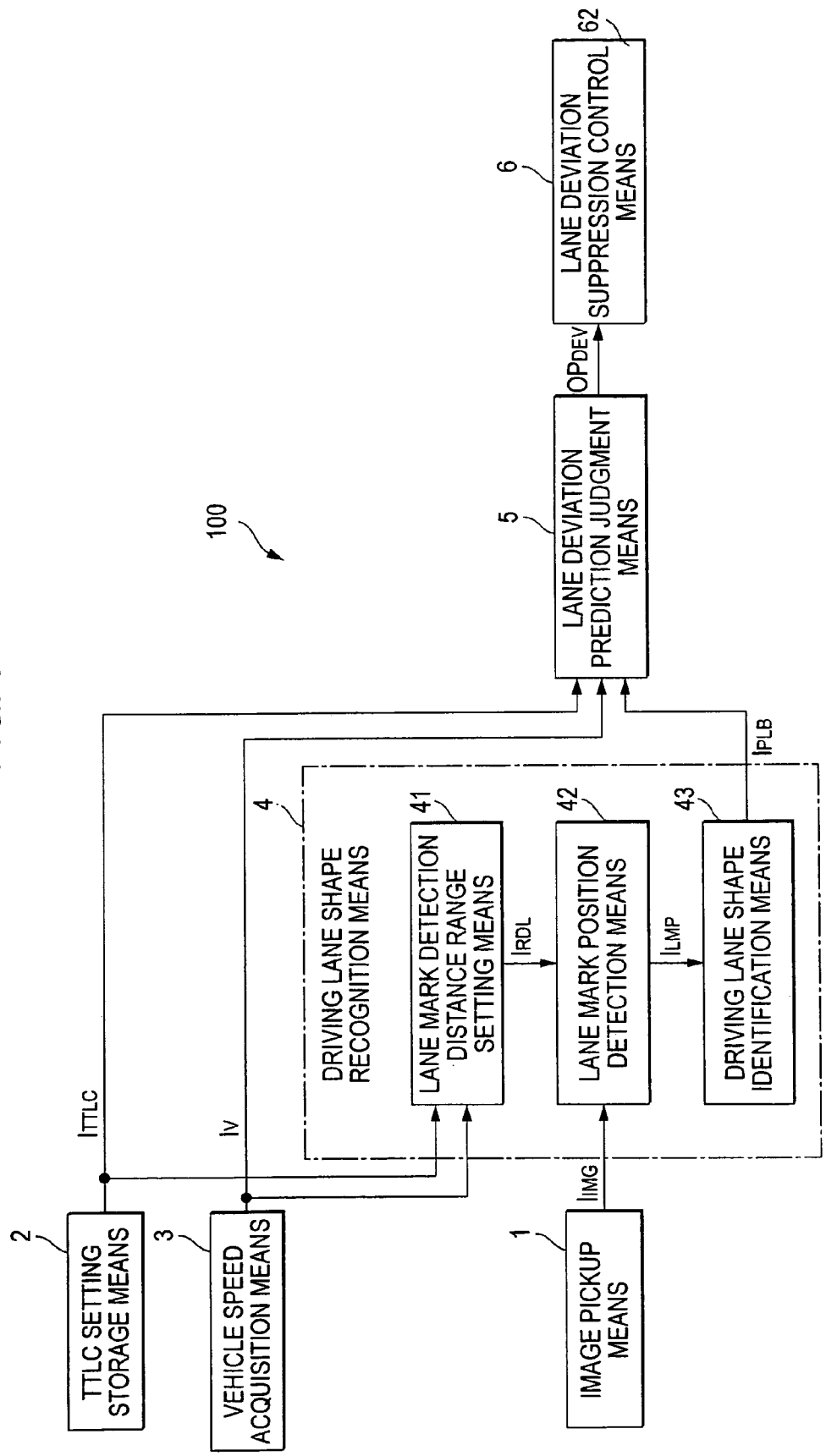
FIG. 7 is a block diagram showing embodiment 2 of a lane deviation prevention apparatus of the invention.

FIG. 7 is a block diagram showing embodiment 2 of a lane deviation prevention apparatus of the invention. In embodiment 2, as deviation prevention output means 6, lane deviation suppression control means 62 is used instead of the alarm generation means 61 of embodiment 1. The others are constructed as same as embodiment 1.

The lane deviation suppression control means 62 is constructed by a steering control unit of a vehicle 13 or a distribution control unit for controlling the driving and braking of the vehicle 13. The lane deviation suppression control means controls the vehicle 13 by the steering control unit or the distribution control unit based on the deviation prevention output $OP_{DEV}$ so that the vehicle 13 moves to the inside of the driving lane 11a. The control can also be made by the steering control unit or the driving and braking distribution control unit based on the deviation prevention output $OP_{DEV}$ so that the lane deviation does not proceed further.

Also in embodiment 2, similarly to embodiment 1, the setting distance R to the lane mark detection distance range RDL is dynamically adjusted so that the deviation prediction judgment line Ldev is always positioned within the lane mark detection distance range RDL. Consequently, the deviation prediction judgment line Ldev always exists within the lane mark detection distance range RDL, the lane deviation prediction judgment operation by the lane deviation prediction judgment means 5 becomes accurate, and the deviation prevention output $OP_{DEV}$ is outputted at a more appropriate timing. Thus, the driver is urged to perform the deviation prevention operation more appropriately, and the uncomfortable feeling to the driver can also be improved.

Embodiment 3

Embodiment 3 is such that in embodiment 1, 2, during the traveling of the vehicle 13, it is judged that the intersection point CL, CR of the deviation prediction judgment line Ldev and the vehicle reference line JLL, JLR is positioned on the boundary shape 15a, 15c or at the outside thereof, and after the deviation prevention output $OP_{DEV}$ is outputted, the lane mark detection distance range setting means 41 sets the lane mark detection distance range RDL on the basis of the intersection point CL or CR.

In embodiment 3, specifically, the lane mark detection distance range setting means 41 is designed such that after the deviation prevention output $OP_{DEV}$ is outputted upon the judgment that the intersection point CL or CR is positioned on the boundary shape 15a, 15c or at the outside thereof, on the basis of the position of the intersection point CL or CR at the time when it is judged to be positioned on the boundary shape 15a, 15c or at the outside thereof, the position of the lane mark detection distance range RDL is set in front of the deviation judgment line Ldev so that the lane mark detection distance range RDL includes the deviation prediction judgment line Ldev including the intersection point CL or CR.

Also in embodiments 1 and 2, the position of the lane mark detection distance range RDL is set so that the deviation prediction judgment line Ldev is always positioned within the lane mark detection distance range RDL. In embodiment 3, on the basis of the position of the intersection point CL or CR at the time when it is judged to be positioned on the boundary shape 15a, 15c or at the outside thereof, the position of the lane mark detection distance range RDL is set in front of the deviation prediction judgment line Ldev so that the lane mark detection distance range RDL includes the deviation prediction judgment line Ldev including the intersection point CL, CR. Thus, the deviation judgment line Ldev can be controlled more certainly to be placed within the lane mark detection distance range RDL, and the deviation judgment can be performed more certainly and at an appropriate timing.

The lane deviation prevention apparatus of the invention is used as a lane deviation prevention apparatus for various vehicles such as automobiles.

What is claimed is:
1. A lane deviation prevention apparatus mounted on a vehicle, comprising:
image pickup means for photographing a front image in front of the vehicle;

driving lane shape recognition means for detecting a lane mark on a road included in the front image within a lane mark detection distance range and for recognizing a shape of a driving lane boundary;

deviation prediction judgment means that judges, based on the shape of the driving lane boundary, whether the vehicle deviates from a driving lane after a deviation prediction time which is previously set and outputs a deviation prevention output in a case where it is judged that the vehicle deviates; and deviation prevention output means that operates based on the deviation prevention output, wherein the deviation prediction judgment means judges whether the vehicle deviates from a boundary pattern of the driving lane on a deviation prediction judgment line corresponding to a vehicle speed and the deviation prediction time, and the driving lane shape recognition means dynamically sets a position of the lane mark detection distance range in accordance with the vehicle speed and the deviation prediction time so that the deviation prediction judgment line is included within the lane mark detection distance range.

2. The lane deviation prevention apparatus according to claim 1, wherein the driving lane shape recognition means includes:

lane mark detection distance range setting means for setting the lane mark detection distance range;

lane mark position detection means for detecting a lane mark position within the lane mark detection distance range;

driving lane shape identification means for identifying the shape of the driving lane boundary based on an output of the lane mark position detect ion means, and the lane mark detection distance range setting means dynamically sets the position of the lane mark detection distance range in accordance with the vehicle speed and the deviation prediction time so that the deviation prediction judgment line is included within the lane mark detection distance range.

3. The lane deviation prevention apparatus according to claim 1, wherein after the lane deviation judgment means judges that the vehicle deviates from the driving lane, the driving lane shape recognition means sets the position of the lane mark detection distance range to include the deviation prediction judgment line in front of the deviation prediction judgment line.

4. The lane deviation prevention apparatus according to claim 1, wherein the deviation prevention output means is alarm generation means for giving an alarm to a driver of the vehicle.

5. The lane deviation prevention apparatus according to claim 1, wherein the deviation prevention output means is lane deviation suppression control means for suppressing the vehicle from deviating from the lane.

* * * * *